Sept. 26, 1950 W. B. ELLWOOD 2,523,903
JIG
Filed April 15, 1948 3 Sheets-Sheet 1
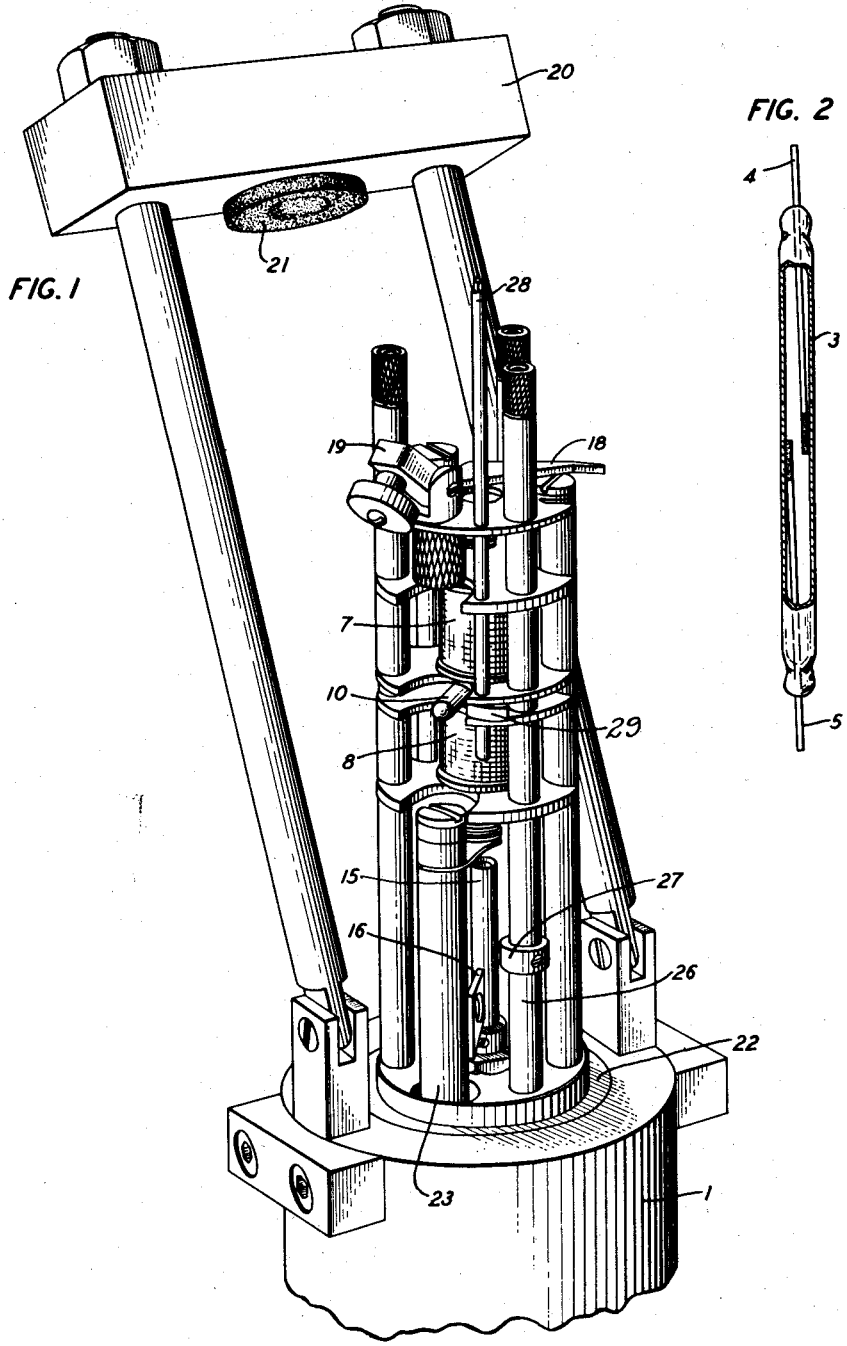
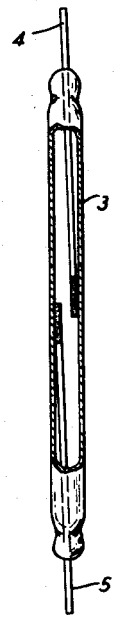
INVENTOR
W. B. ELLWOOD
BY
ATTORNEY Sept. 26, 1950 W. B. ELLWOOD 2,523,903
JIG Filed April 15, 1948 3 Sheets-Sheet 2

INVENTOR
W. B. ELLWOOD
BY
ATTORNEY

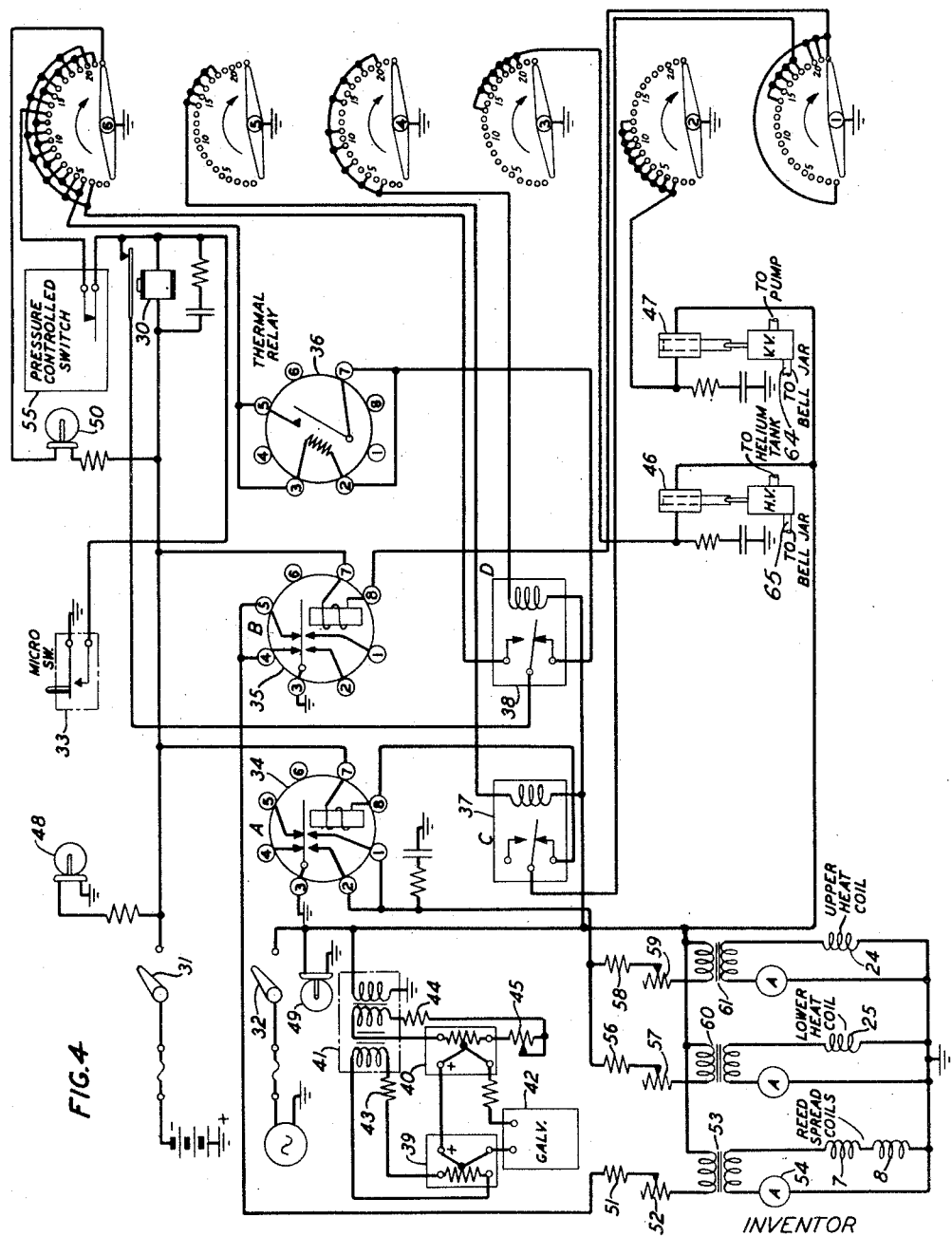

Patented Sept. 26, 1950

2,523,903

UNITED STATES PATENT OFFICE 2,523,903

JIG

Walter B. Ellwood, New York, N. Y., assignor to Bell Telephone Laboratories, Incorporated, New York, N. Y., a corporation of New York Application April 15, 1948, Serial No. 21,160

3 Claims. (Cl. 49—1)

This invention relates to electromagnetically operated switches and particularly the wire type glass sealed switch in which the magnetically movable members also act as the contact device. Switches of this kind consist generally of a tiny glass tube with magnetic contact wires sealed in at the ends of the tube and immersed in an inert gas. These contact units are inserted into solenoids so that the air gap of the completed relay comes at the point in the center of the coil where the greatest magnetic efficiency is obtained.

The object of the invention is to provide a method of manufacture whereby contact units of great uniformity may be economically and rapidly produced. Economy comes through simplicity of design and the small number of different parts employed. Rapidity in the manufacture comes from the reduction of the process to practically routine machine operation and uniformity comes from the machine handling thereof and the consequent elimination of the human element in the operations. Due to the small size of the contact units, the extremely small movement of the wires and the fact that no adjustments can be made after the wires have been sealed into the tubes, great accuracy and skill must be exercised in producing such units. But since experience has shown that a method of manufacture which depends upon the skill of the operator alone is generally unsound from an economical standpoint, the object of the present invention is to provide a method which substitutes a novel operation for one which would otherwise require great skill and delicacy of handling.

Another object of the invention is the elimination of internal jigs and mandrels. Glass tubing of a precise internal diameter is used so that as the ends of the wires rest against the inside surfaces during the sealing process they are precisely spaced from each other and the tubing itself becomes in effect an internal mandrel.

In accordance with these objects, a jig is provided having a magnetic means for holding the wires in proper spatial relation to each other and at the same time for mechanically vibrating such wires to overcome any friction tending to hold them in improper positions. This means is effective during the following sealing operation in which the two ends of the tube are simultaneously heated to the point where the glass flows in and makes an air-tight seal about the said wires.

In the process of manufacture a properly sized glass tube is positioned in the jig and along the axis of a plurality of solenoids. One of the contact wires is inserted upwardly into the tube and allowed to rest on a magnetic seat below the tube. Two of the said solenoids are then energized by alternating current of a frequency which will cause a very slight vibration in the magnetic wires. The second contact wire is then suspended from a permanent magnet and lowered into the tube so that its end overlaps the first wire by a given amount. The two coils which are now energized by alternating current are poled in such a manner that the overlapping ends of these wires are forced apart by magnetic repulsion and come to rest with practically no strain against the inner sides of the glass tube which may either be of a carefully selected inside diameter or which may have its inside diameter at this point preformed to a given dimension. A bell jar is placed over the jig assembly and helium or any other desired inert gas is flowed therethrough so that the tube containing the overlapping contact wires is also filled with this gas. The bell jar may be pumped to a good vacuum before filling with helium. While the wires are thus under the magnetic influence of the said coils, two other small solenoids one on either end of the glass tube are supplied alternating current sufficient to heat the ends of the glass tube to the melting point. The glass ends of the tube flow inwardly and make a seal with the wires. As this seal becomes effective the increase in temperature of the gas within the tube which is now trapped tends to produce a bubble at one or both ends and this tendency must be counteracted by an increase in pressure of the gas within the bell jar. When the seals have become perfect as determined on the basis of time and temperature, the current in the heating coils is cut off and the unit is allowed to cool.

A feature of the invention is the simultaneous repulsion of the wire ends and the vibration thereof to settle them into place and the application of pressure to cause good seals to form between the glass envelope and the contact wires.

Other features will appear hereinafter.

The drawings consist of three sheets having four figures as follows:

Fig. 1 is a perspective view of the jig in which the various parts of the contact device are placed for the automatic operation of sealing the parts together;

Fig. 2 is a longitudinal section of a contact device which is fabricated by the means of the present invention;

Fig. 4 is a circuit diagram of the means employed for sequentially controlling the various operations.

Figure 3:
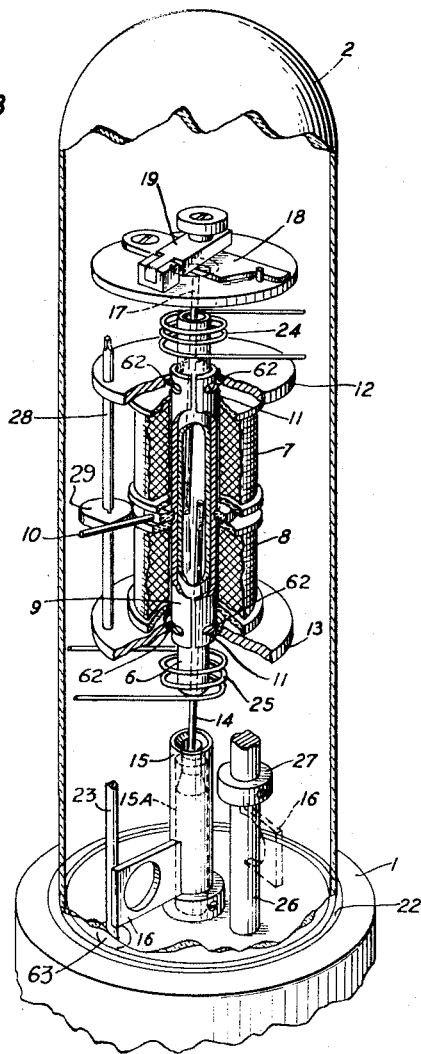
Fig. 3 is a schematic view partly in perspective and partly cut away to show the manner in which the sealing operation is performed.

The jig consists essentially of a base member 1 supporting the various parts of the jig which may be covered with a bell jar indicated by the broken line 2 in Fig. 3 so that the jig and the parts of the contact device may be held in a controlled atmosphere.

The device which is fabricated by the means provided by the present invention consists of a glass envelope 3 having sealed into the opposite ends thereof the two magnetic contact elements 4 and 5. The envelope 3 is in the form of a short piece of glass tubing whose inside diameter has been formed so as to have a precise inside diameter. The contact elements have their tips electroplated with contact metal as indicated. The processing device is a means for placing these three elements in the proper spatial relation to each other and for then filling the inside of the envelope with a selected gas under a given pressure and then sealing the parts together automatically.

In the operation and as shown more clearly in Fig. 3, a glass tube 6 is inserted into the two coils 7 and 8 and is gripped in the proper position by means of a clutch here indicated by a slotted metal tube 9 which is rotatable but may be caused to tightly grip the glass tube by moving the arm 10 until metal balls 62 riding in grooves 11 and bearing against the inside surfaces of the elements 12 and 13 reduce the inside diameter of this metal tube sufficiently. In order to adjust the glass tube to a given position the sleeve 15 mounted on post 15A is rotated in a counter-clockwise direction until the arm 16 comes in contact with the post 26 and this assembly is then pushed upward until the arm 16 is stopped by the collar 27 as indicated by the broken line representation of the arm 16. The glass tube may then be tightened by fitting a key to the top of the post 28 so that by the rotation of cam 29 the arm 19 affixed to the sleeve 9 may be moved and the sleeve 9 rotated as described. When the glass tube is firmly fixed in the given position then arm 16 is returned to its initial position after which the lower electrode 14 is dropped through the tube and comes to rest on a bearing formed by a seat in the top of the post 15A and the conical funnel in the end of sleeve 15.

An element 18 is shown in Fig. 1 in the position it takes when the glass tube is lowered into the jig. Later this element is rotated in a clockwise direction until it covers the hole through which the glass tube was lowered and provides a smaller hole through which the second electrode 17 is dropped and accurately centered, Fig. 3. This second electrode 17 must be held in this position by a pair of tweezers or other means until a permanent magnet 19 is rotated from the position shown in Fig. 1 to the position shown in Fig. 3 and which thereafter holds the magnetic element 17 in the position indicated.

The coils 7 and 8 are then connected to a source of current whereby the upper electrode 17 is magnetized by the coil 7 and the lower electrode 14 is magnetized by the coil 8. The magnetization of these two electrodes is in opposite directions so that their ends repel each other and they come to rest against the precisely dimensioned inside surfaces of the glass tube.

When the parts are thus secured the bell jar 2 is placed over the jig and the yoke 20 provided with a yielding surface 21 is moved into position to hold the bell jar firmly in the position indicated in Fig. 3. Pressure to hold the bell jar in place is provided by cams not shown in drawing. The bottom of this bell jar will rest on a ring 22 of yielding material so that an air-tight connection may be formed. It is important that this material have a low vapor pressure and high stability against heat. One of the silicone rubbers has proved satisfactory. In Fig. 1 the post 23 is shown to come through the base with a space provided about it. Through this space 63 the bell jar may be piped by pipes 64 and 65 leading through valves to a vacuum pump and a tank of gas under pressure, respectively, whereby the bell jar may be evacuated and it may be later filled with a selected gas. When this gas, such as helium, has filled the bell jar then the heating coils 24 and 25 are energized by electric current until the ends of the glass tube become sufficiently molten to form the seals as shown in Fig. 3.

As the seals begin to form, the pressure of the gas within the bell jar is raised until it exceeds slightly the increased pressure within the glass envelope 3 induced by the heated ends of the glass tube so that the glass in the seals flows in rather than out. This causes the inside surface of the glass to be as shown in Fig. 2. One of the features of the present invention is a means for automatically increasing this pressure as the seals are formed.

When the gas is first admitted to the bell jar the flow is automatically stopped when a predetermined pressure is reached by means of a conventional pressure controlled switch. Thereafter the ends of the glass tube are heated and as the seals begin to form the gas is again admitted but this time not under control of the pressure switch so that the pressure will rise above the pressure first established. The valve shown in Fig. 4 as HV is a conventional metering valve and will allow the build-up of pressure from a tank of gas under comparatively high pressure at a completely controlled rate. Since the time during which this valve is opened is under control of a timer the rise of pressure as the seals are forming follows a completely predetermined pattern.

After the seals have formed, the pressure within the bell jar is maintained for a certain length of time after the heating coils 24 and 25 have become deenergized so that the ends of the glass tube will cool sufficiently to solidify. Thereafter, the flow of the gas through the bell jar is discontinued and the finished contact device as shown in Fig. 2 is removed.

The means whereby the contact devices are sealed by automatic operation after the three parts have been placed within the jig as described is shown by the circuit diagram, Fig. 4. One of the elements of the device is a step-by-step switch having six wipers as shown, each associated with a series of twenty-two contacts. Wiper No. 6 is a bridging type—the others do not bridge. In its normal position this switch remains on contact No. 22. The six wipers of the switch are under control of the magnet 30. When this magnet is energized it will move a pawl to engage a new ratchet tooth and when the magnet is thereafter deenergized it will move all six wipers forward one step.

When the device is to be put in operation, switches 31 and 32 are closed. The switch 31 connects an operating source of direct current to the circuits of this device and the switch 32 connects a source of alternating current to certain other portions of the circuit where alternating current may be used advantageously.

A number of various instrumentalities are used which may be described as follows: The contact arrangement shown in the broken line box 33 is known as a microswitch and is one which will operate through a very slight finger pressure put upon the button shown at the top thereof. The device generally identified by the designation 34 and the similar device generally identified by the numeral 35 are relays mounted in the manner of electronic tubes. The device generally identified by the numeral 36 is a thermal relay which will close a circuit maker and breaker after a coil indicated therein has conducted current for a given length of time. The devices shown in the rectangles 37 and 38 are timers, that is, they are small devices having a clock movement and are arranged in each case after the winding thereof has been connected to a source of alternating current to operate a circuit maker and breaker shown also in the same rectangle. When the source of alternating current is disconnected from the winding of one of these devices it will in a small given period return the circuit maker to the position shown and thereafter will repeat the cycle in the same time when again energized.

The devices shown in the rectangles 39 and 40 are thermal converters, the heater element of each of which is energized from a separate winding of a transformer 41 and which heats a polarized thermocouple element. These two thermocouple elements are connected in opposition and thence to a galvanometer 42 by means of suitable resistances 43 and 44 and a small rheostat 45. The response of the galvanometer is adjusted to a zero reading when both converters are in air at atmospheric pressure.

In operation, one of these thermocouples is placed within the bell jar and the other is placed outside the bell jar. When the bell jar is filled with air at atmospheric pressure then the galvanometer will read zero. When the bell jar is evacuated, then part of the means of conducting the heat away from the heating element therein is removed. Then the thermocouple element will become heated to a degree different from the other thermocouple element on the outside of the bell jar and consequently the galvanometer will read in one direction. When, on the other hand, the bell jar is filled with helium, this gas being a better heat conductor than air, the response of the thermocouple within the bell jar will be different in the opposite sense and hence the galvanometer will display a reading in the opposite direction. Thus, the galvanometer will indicate whether the bell jar has been evacuated, whether it contains air at atmospheric pressure, or whether it contains helium and also by the magnitude of these readings will at least roughly indicate the purity of the gaseous state within the bell jar. This device is thus a convenient manometer for indication of proper operation of the assembly jig.

The devices 46 and 47 generally indicate electromagnetically operated gas valves. The valve 46 is for putting a source of helium in communication with the bell jar and the valve 47 is for connection of the bell jar to a vacuum pump which runs continuously.

When the device is to be put into operation, then the switches 31 and 32 are closed as hereinbefore stated. The closure of switch 31 lights the signal lamp 48 and the closure of the switch 32 lights the signal lamp 49 indicating that the two sources of power are effective. Assuming here that the switch is in its normal position, a circuit will be extended from ground, wiper 6 of the switch in its position 22, through the signal lamp 50 to battery so that the glowing of this lamp indicates that the switch is in its normal position ready for the following operations. Alternating current supplied to the primary of the transformer 41 will place the galvanometer (helium vacuum indicator) circuit into operation. A circuit will also be extended from ground, the stepping switch arm 1, over its contact 22, through the winding of the relay 35 to battery so that relay 35 is operated to remove ground from the circuit for operating the reed spread coils 7 and 8. The operator will then press the microswitch 33 and immediately release it. During the interval in which this switch is operated a circuit may be traced from ground through the winding of the stepping magnet 30 to battery so that when the microswitch 33 is released the arms of the switch will advance from position 22 to position 1.

In position 1 of the switch the relay 35 remains operated as before described. At this time the glass tube is inserted and clamped in the jig and the lower wire may be dropped into place. When this has been accomplished the operator will press the microswitch 33 to advance the switch arms to their position 2.

In position 2 the relay 35 becomes deenergized so that a circuit may be traced from ground, through the armature and back contacts of the relay 35, through the resistances 51 and 52 and the primary of a transformer 53 to the source of alternating current whereby alternating current is induced to flow through the reed spread coils 7 and 8. The magnitude of this current may be noted by the reading of an ammeter 54.

Now the element 18 is moved to the position shown in Fig. 3, the top wire is lowered therethrough but held at its upper extremity by tweezers and the magnet 19 is moved into contact with the upper end of the wire. The tweezers are withdrawn and the magnet moved into the position shown in Fig. 3 to hold the top wire 17 suspended. The magnetization of the spread coils 7 and 8 will cause these two wires 14 and 17 to take up the position indicated in Fig. 3 with their plated ends resting against the inside surfaces of the precisely dimensioned tube so that these wires will be at a specified distance from each other. The bell jar is now placed in the position indicated in Fig. 3 and clamped down by the clamp 29 so that the automatic operation of sealing the circuit maker and breaker together may now take place. To start this operation the operator presses the microswitch to advance the stepping switch to its position 3.

In position 3 a circuit may be traced from ground, the switch arm 2, the vacuum valve 47 to the source of alternating current whereby the vacuum valve is operated in order to evacuate the bell jar. At the same time, a circuit is closed from ground, the switch arm 4, through its No. 3 contact, the winding of the timer 38 to the source of alternating current whereby the movement of the timer will commence. At this time also a circuit is established from ground, the No. 5 switch arm, through its third position to the front contact of the contact means shown within the timer 38.

In about one minute the timer will operate the contacts to their other position so that the ground connected to the front contact will now be extended through the armature and back contact of the stepping magnet 30 and the winding thereof to battery whereby the switch is moved from its third to its fourth position.

The timer is of a conventional type having a motor such as that used in the electrical clock movements. The contacts when they become operated are thereafter held in operated position until the motor coils become deenergized. Thus, when the switch moves to position 4 the coil of the timer 38 becomes deenergized and the contacts immediately start to move back to their normal position as shown. However, the means for operating the contacts is connected with the timer motor with a conventional clutch arrangement and this takes a short time (about 5 seconds) to return the contacts to normal so that a delay must be introduced before moving the switch to position 5 where the timer will again be energized. Therefore, in position 4 a circuit is established from ground, the No. 6 arm of the stepping switch, through the winding of the thermal relay 36 and the back contact of the switch controlled by the timer 38, the armature and back contact of the stepping magnet 30, the winding of the stepping magnet 30 to battery. However, the resistance of this thermal relay is sufficiently high to prevent the energization of the stepping magnet 30 so that this magnet is not affected until a few seconds thereafter when the thermal switch closes its contacts to short-circuit its heating element and thereby reduce the resistance value of the circuit. At this time the stepping magnet 30 becomes energized and moves the switch arms to their position 5.

This same cycle of the energization of the timer while the switch arms are on their odd-numbered contacts and then the energization of the slow operating thermal relay while the switch arms are on their even-numbered contacts takes place several times in order to maintain the vacuum valve open for a given period. As indicated in these drawings, this vacuum valve will remain open for a period of somewhat more than five minutes, that is, until the switch has been moved from its position 12 to its position 13.

In position 13 a circuit will be established from ground, the No. 3 arm of the switch and thence through the solenoid of the helium valve 46 to the source of alternating current whereby helium is now admitted to the bell jar.

At the same time a circuit is established from ground, the No. 6 switch arm, over its 13th contact, through the normally closed contacts in the device 55, the winding of the stepping magnet 30 to battery. The device 55 is a conventional pressure responsive device which is placed in communication with the interior of the bell jar and will, therefore, respond to the pressure therein. The contacts of this device are adjusted so that when the pressure has been raised to about one pound above atmospheric pressure the contacts therein will open. During the time that the contacts are closed, the stepping magnet 30 remains operated and, therefore, does not move the switch arm but when the pressure has risen to the proper value these contacts become open and the consequent deenergization of the stepping magnet 30 moves the switch arms on to their 14th position.

In the 14th position the helium valve 46 is closed. In position 14 of the switch arms, a circuit is now established from ground, arm No. 1, position 14, the normally made contacts of timer 37, the winding of relay 34 to battery. Relay 34 in operating establishes a circuit from ground, the armature and front contacts thereof through the resistances 56, 57, 58 and 59 to the primary windings of the transformers 60 and 61 whereby a properly adjusted current may be caused to flow from the secondaries thereof through the upper heating coil 24 and the lower heating coil 25 in order to form the seals. Resistances 56 and 58 may be ballast lamps if required to maintain a constant current in the face of line voltage fluctuation. The timer 37 is adjusted to operate in a minute and a half, whereas the timer 38 is adjusted to operate in one minute. Therefore, the ends of the glass tube will be heated for a minute and a half before the contacts of the timer 37 operate to release the relay 34. For the first minute of this period the glass becomes molten sufficiently so that at about the end of the minute the seals are actually formed. At the end of this time as controlled by the timer 38, the helium will again be admitted to the bell jar so as to increase the pressure external to the device being sealed and the heat will be maintained at the ends of the tube for another half minute in order to allow the glass to properly adjust itself in contact with the magnetic members. Therefore, in position 14 the relay 34 is operated as described. Another circuit is established from ground, switch arm 4, position 14 to the timer 38. A third circuit is established from ground, switch arm 5, position 14 to the timer 37.

When at the end of one minute the contacts of timer 38 operate, a circuit is established from ground, the switch arm 6, contact 14, the front contact of the timer 38, through the armature, back contact and winding of the stepping magnet 30 whereby the switch arms are moved to their 15th position. It may now be noted that the helium valve is closed in the 15th position and remains closed thereafter through positions 16, 17, 18, 19 and 20. In position 15, a circuit is established from ground to switch arm 6, through the heating element of the thermal relay 36, the back contact of the timer 38 which closes as soon as the switch arm 4 moves off its 14th position to the stepping circuit but as before, the resistance of the heating element is such that the stepping circuit is not energized at this instant. A few seconds thereafter when the contacts of the thermal relay close, then the stepping circuit is energized and the switch moves to its 16th position.

The circuit for the timer 37 is maintained closed in the 14th, 15th, 16th, 17th and 18th positions whereby the contacts controlled thereby are maintained in their open position after the first minute and a half of the operation of this device. Therefore, in one minute and a half after the switch has been moved to its 14th position the contacts of timer 37 will operate and thereby release the relay 34 so as to deenergize the upper and lower heating coils. The pressure of the helium about the device is maintained for a period of about four minutes as may be seen from the fact that the timer 38 is operated in four cycles, that is, when the switch arms are in their positions 14, 16, 18 and 20. At the end of the last operation of the timer 38 in position 20 of the switch, the switch will be moved in the manner described to its position 21 and shortly thereafter in accordance with the operation of the thermal relay 36 will be moved to its final position 22 where the signal lamp 50 is operated to signal the completion of the operation.

It may be noted that when the switch arm reaches position 20 and thereafter through positions 21 and 22, the relay 35 will be operated to deenergize the reed spread coils 7 and 8. This is to facilitate the cooling of the completed switch as the spread coils operate at a rather high temperature. When an attending operator notes the glowing of the signal lamp 50 she may then remove the bell jar and by moving the permanent magnet 19 and the stop 18 to the position shown in Fig. 1 may extract the finished contact device and prepare to load the jig for another operation.

It may also be noted that after the bell jar has been evacuated that the helium is then allowed to flow into the bell jar until a specified pressure is attained. Thereafter the ends of the glass tube are heated and as they begin to soften to form a seal, helium is again introduced into the bell jar so that the pressure is raised to a point which will balance the pressure within the device being fabricated which increases due to the heat of the ends being sealed. The supply of helium is set by means of the conventional metering helium valve at a pressure so that the pressure within the bell jar gradually rises during the 15th, 16th, 17th, 18th, 19th and 20th positions of the switch, this time not under the control of the pressure switch.

What is claimed is:

1. A jig for manufacturing glass sealed wire contact devices consisting of a plurality of four wire coils and means for supporting a glass tube within said coils along the axis thereof, magnetic means for suspending one wire in the upper end of said tube, a seat for supporting a second wire in the bottom end of said tube, two said wire coils, one surrounding each said end of said tube for heating said tube ends to soften the glass thereof to seal said tube to said wires and two said wire coils surrounding the mid-sections of said tube connected to a source of alternating current and poled to render the overlapping ends of said wires of the same polarity to simultaneously drive said overlapping ends apart and to produce a vibration therein to properly position said wires in said tube during the said sealing of the ends of said tube.

2. A jig for manufacturing glass sealed wire contact devices consisting of a plurality of four wire coils and means for supporting a glass tube within said coils along the axis thereof, magnetic means for suspending one wire in the upper end of said tube, a seat for supporting a second wire in the bottom end of said tube, two said wire coils, one surrounding each said end of said tube for heating said tube ends to soften the glass thereof to seal said tube to said wires and two said wire coils surrounding the mid-sections of said tube connected to a source of alternating current and poled to render the overlapping ends of said wires of the same polarity to simultaneously drive said overlapping ends apart and to produce a vibration therein to properly position said wires in said tube during the said sealing of the ends of said tube, a bell jar for covering said jig and means for passing through said bell jar and said tube a supply of inert gas.

3. A jig for manufacturing glass sealed wire contact devices consisting of a plurality of four wire coils and means for supporting a glass tube within said coils along the axis thereof, magnetic means for suspending one wire in the upper end of said tube, a seat for supporting a second wire in the bottom end of said tube, two said wire coils, one surrounding each said end of said tube for heating said tube ends to soften the glass thereof to seal said tube to said wires and two said wire coils surrounding the mid-sections of said tube connected to a source of alternating current and poled to render the overlapping ends of said wires of the same polarity to simultaneously drive said overlapping ends apart and to produce a vibration therein to properly position said wires in said tube during the said sealing of the ends of said tube, a bell jar for covering said jig, means for passing through said bell jar and said tube a supply of inert gas, and means to increase the pressure in the said bell jar to balance expansion of gas within said tube due to the heating thereof as the said seals are being formed.

WALTER B. ELLWOOD.

REFERENCES CITED

The following references are of record in the file of this patent:

UNITED STATES PATENTS

| Number | Name | Date |
| --- | --- | --- |
| 2,353,783 | Noel | July 18, 1944 |
| 2,391,573 | Herzog | Dec. 29, 1945 |
| 2,406,008 | Ellwood, et al. | Aug. 20, 1946 |
| 2,406,021 | Little | Aug. 20, 1946 |